（12）United States Patent
Nickum

(10) Patent No.: US 7,174,513 B1
(45) Date of Patent: Feb. 6, 2007

(54) SYSTEM AND METHOD FOR ADVANCED NETWORK VIEWING

(75) Inventor: Larry A. Nickum, Sioux City, IA (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 09/378,208

(22) Filed: Aug. 20, 1999

(51) Int. Cl.
G06F 3/00 (2006.01)

(52) U.S. Cl. ............... 715/738; 715/760; 715/838; 715/855

(58) Field of Classification Search ............ 715/733, 715/744, 748, 760, 838–839, 781, 803–804, 715/853–855, 501.1, 513, 712, 713, 714, 715/738, 810, 835, 841, 968; 709/203, 201; 707/10

See application file for complete search history.

(56) References Cited

U.S. PATENT DOCUMENTS

| | | | |
|---|---|---|---|
| 5,572,643 A | 11/1996 | Judson | |
| 5,742,768 A | 4/1998 | Gennaro et al. | |
| 5,761,655 A | 6/1998 | Hoffman | |
| 5,768,578 A | 6/1998 | Kirk et al. | |
| 5,778,372 A | 7/1998 | Cordell et al. | |
| 5,802,530 A | 9/1998 | Van Hoff | |
| 5,835,724 A | 11/1998 | Smith | |
| 5,864,863 A | 1/1999 | Burrows | |
| 5,870,559 A | 2/1999 | Leshem et al. | |
| 5,870,769 A | 2/1999 | Freund | |
| 5,870,770 A | 2/1999 | Wolfe | |
| 5,959,621 A * | 9/1999 | Nawaz et al. | 345/733 |
| 6,005,578 A * | 12/1999 | Cole | 345/854 |
| 6,023,701 A * | 2/2000 | Malik et al. | 707/10 |
| 6,211,874 B1 * | 4/2001 | Himmel et al. | 345/781 |
| 6,237,030 B1 * | 5/2001 | Adams et al. | 709/218 |
| 6,243,091 B1 * | 6/2001 | Berstis | 345/839 |
| 6,256,028 B1 * | 7/2001 | Sanford et al. | 345/841 |
| 6,271,840 B1 * | 8/2001 | Finseth et al. | 707/513 |
| 6,278,448 B1 * | 8/2001 | Brown et al. | 345/866 |
| 6,356,908 B1 * | 3/2002 | Brown et al. | 707/10 |
| 6,381,618 B1 * | 4/2002 | Jones et al. | 707/203 |
| 6,483,525 B1 * | 11/2002 | Tange | 345/765 |

FOREIGN PATENT DOCUMENTS

WO     WO 97/49044     12/1997

OTHER PUBLICATIONS

Schmid, S. (Web Representation with Dynamic Thumbnails, University of Ulm; pp. 1-6; Mar. 1998).*

* cited by examiner

Primary Examiner—Sy D. Luu
(74) Attorney, Agent, or Firm—Jeffrey M. Anderson; Suiter Swantz PC LLO

(57) ABSTRACT

A system and method for advanced network viewing is disclosed. In accordance with one aspect of the invention, a system and method for generating a representation of a linked site is disclosed. A user may view the contents of a linked site from an original site accessed by the user without manually accessing the linked site. One method of accomplishing this task includes the steps of accessing a first site; querying at least one of a link and a second site linked to the first site; generating a representation of the linked second site; and communicating the representation wherein the representation enables a user to preview the linked second site. In an exemplary embodiment of the present invention the representation may comprise a thumbnail representation of the second site so that users may preview the contents of the second site by accessing the first site.

66 Claims, 11 Drawing Sheets

SYSTEM AND METHOD FOR ADVANCED NETWORK VIEWING

FIELD OF THE INVENTION

The present invention generally relates to network browsing, and particularly to a system and method providing advanced network viewing.

BACKGROUND OF THE INVENTION

The Internet, and more particularly the World Wide Web, has experienced remarkable growth with no signs of decreasing. Because of the astonishing growth, navigating through the vast amounts of information contained in this resource has become increasingly more complex as the number of sites and resources has expanded. A search for a particular field or area of information may involve searching through a variety of sites and pages that contain links to other sites and pages, forming a maze that is difficult to sift through. Sometimes the text representing the link may be misleading about the contents contained in the site. Without knowing the actual content of each linked site, it is necessary to access each individual page to view the contents of the desired page to determine if the contents are applicable. Downloading and communicating each individual site may waste a great deal of time. Problems with access times, throughput rates, and processor speeds may make the process even more burdensome and expensive.

Additionally, searches for a particular area of interest or topic may develop erroneous results, such as sites and pages that are not relevant to the stated search request. Often, words and terms are included in the relevant site searching data to merely draw users to the particular provider's site. This descriptive information may have no bearing on the particular topic desired. Even if the information is relevant, the user may not choose to access it because the description for the site is inadequate. Furthermore, some site providers may use several names and addresses to keep drawing users to the same site. A user is often forced to access the same site repeatedly while trying to locate information on a particular topic.

The present invention addresses these and other limitations in existing products and technologies.

SUMMARY OF THE INVENTION

Accordingly, the present invention provides a system and method for advanced network viewing. In one aspect of the invention, a system and method for generating a representation of a linked site is disclosed. A user may view a representation of the contents of a linked site from the display of an original site accessed by the user without manually accessing the linked site. One method of accomplishing this task includes the steps of accessing a first site; querying at least one of a link and a second site linked to the first site; generating a representation of the linked second site; and communicating the representation wherein the representation enables a user to preview the linked second site in the display of the first site. In an exemplary embodiment of the present invention the representation may comprise a thumbnail representation of the site so that users may preview the contents of the site.

In accordance with another aspect of the present invention, a system and method wherein a first site may utilize a utility to automatically query a link or a linked second site contained in the first site and store the representation of the linked second site is disclosed. In this embodiment, a user may access a first site and view representations of a second linked site from a display of the first linked site. The system may store representations in the first site, thereby eliminating the need for the system to access the linked second site every time the first site is accessed for display.

In accordance with another aspect of the present invention, a system and method is disclosed wherein a second site may utilize a utility to automatically query itself to form and store the representation of the second linked site, and wherein a first site may utilize a utility to automatically query the second site and store the representation from the second site on the first site. In this embodiment, a user may access a first site and view representations of a second linked site in the display of the first linked site. Because the system may store representations in the first site, it eliminates the need for the system to access the linked second site every time the first site is accessed for display.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which is illustrated in the accompanying drawings.

Figure 1:
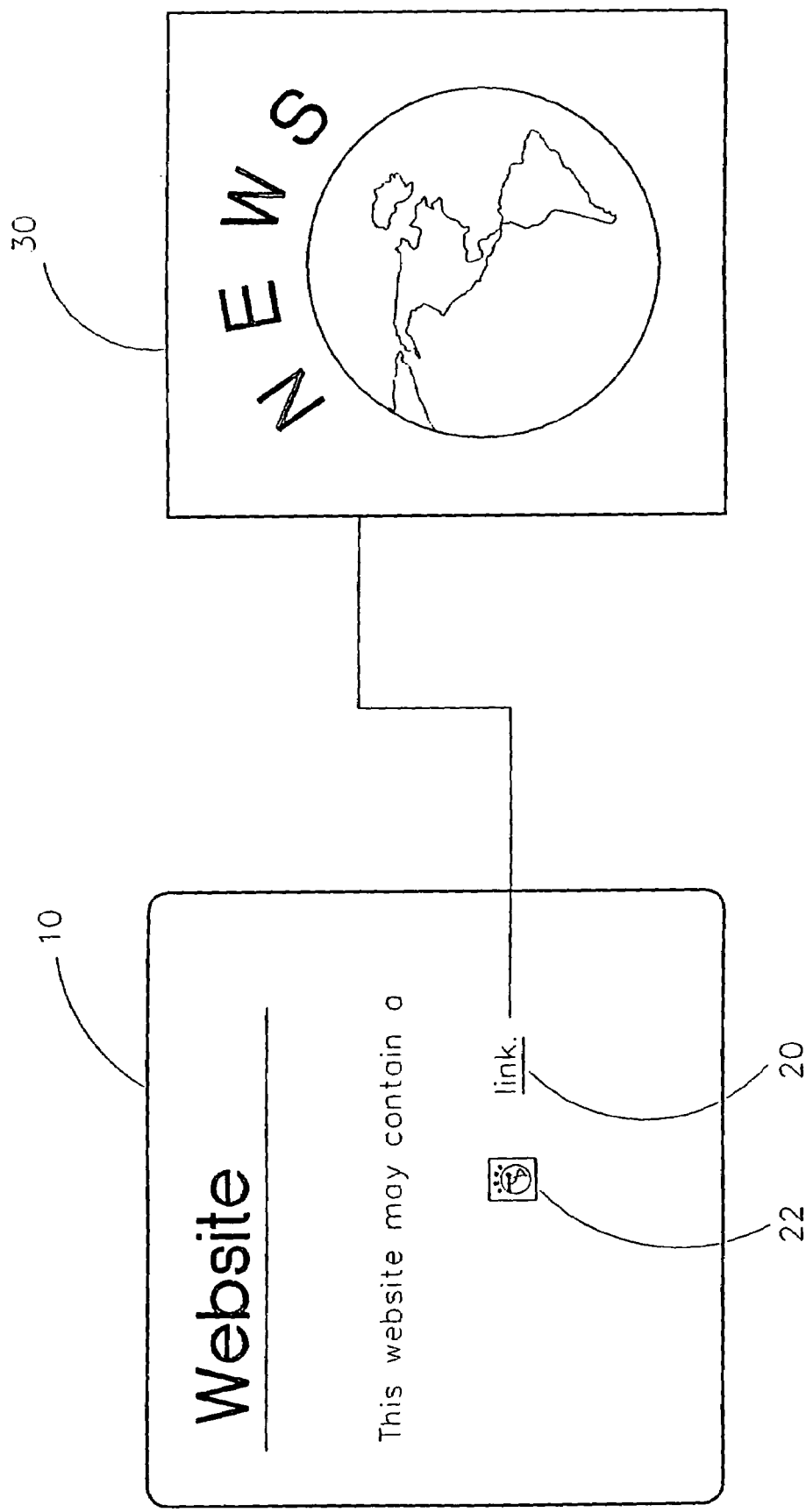
FIG. 1 is an illustration depicting an exemplary embodiment of the present invention wherein a representation is disposed proximally to a link contained in a display of a site.

Referring now to FIG. 1, an exemplary embodiment of the present invention is shown for previewing linked network sites. A network may include a local area network (LAN), wide area network (WAN), Internet, world wide web, online information service, billboard service, etc. Sites may include web sites, pages, file transfer protocol sites, nodes, billboards, and other resources as contemplated by a person of ordinary skill in the art. A user may access a site 10 containing a link 20 to another site 30, such as a web site or page. To preview the linked site 30, a representation 22 of the linked site 30 may be generated and communicated to a user in the display of the site 10, in this example displayed proximally to the link 20. In this example, the representation 22 is a thumbnail, such as a miniature version of an image of the linked site 30 that may be utilized to enable quick previewing of multiple images and pages. A thumbnail representation 22 may incorporate a snapshot taken of the linked site 30. In this manner, a user may preview the contents of the linked site 30 without manually accessing the linked site 30. It should be apparent that the representation may be communicated in a wide variety of ways, including but not limited to aural, visual, tactile and other methods as contemplated by a person of ordinary skill in the art. Additionally, the system may query linked sites after downloading text and other information so that a user may view the contents of a site while the system generates representations of linked sites.

Figure 2A:
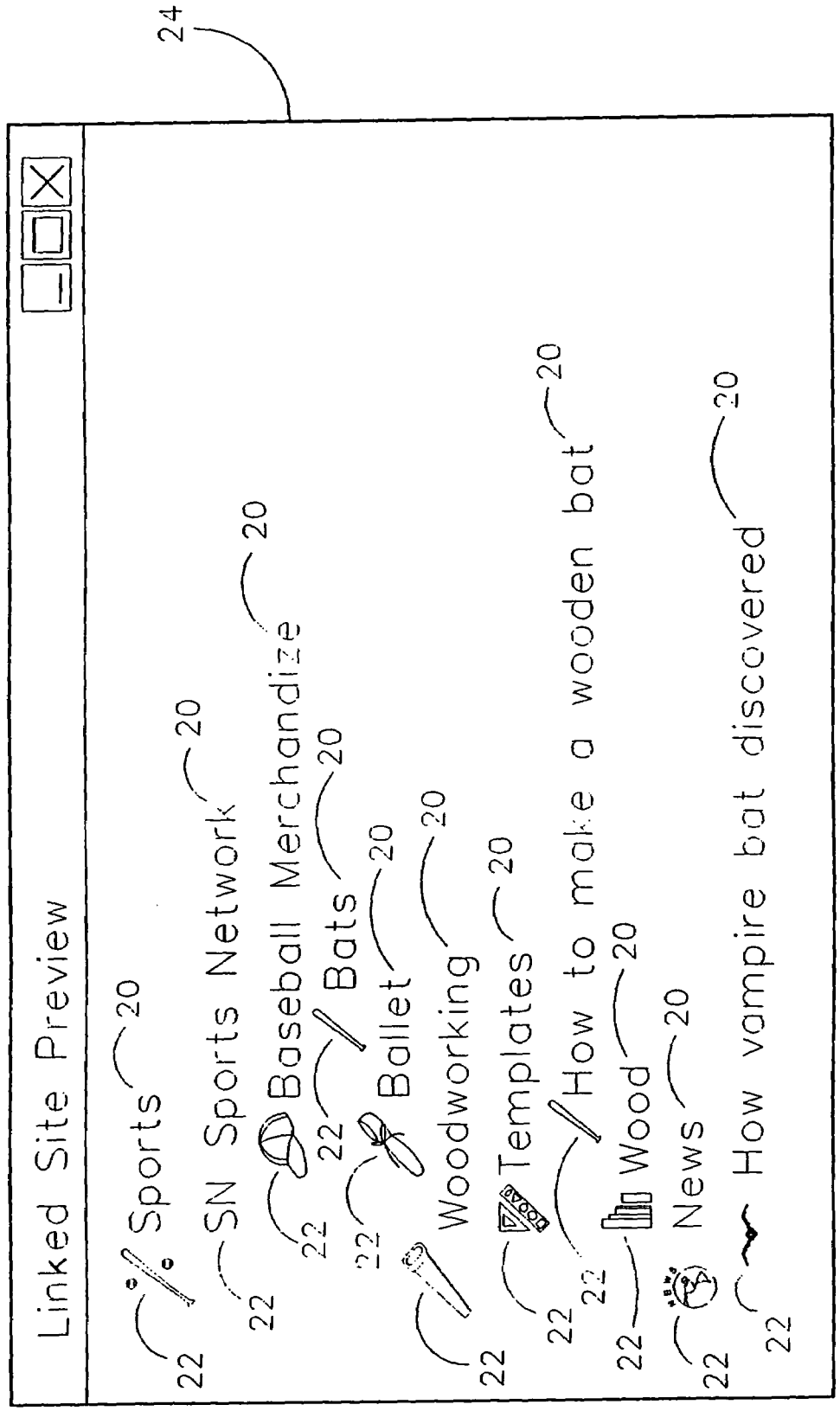
FIG. 2A is an illustration depicting an exemplary embodiment of the present invention wherein a plurality of representations are displayed in hierarchies on a separate window.
Figure 2B:
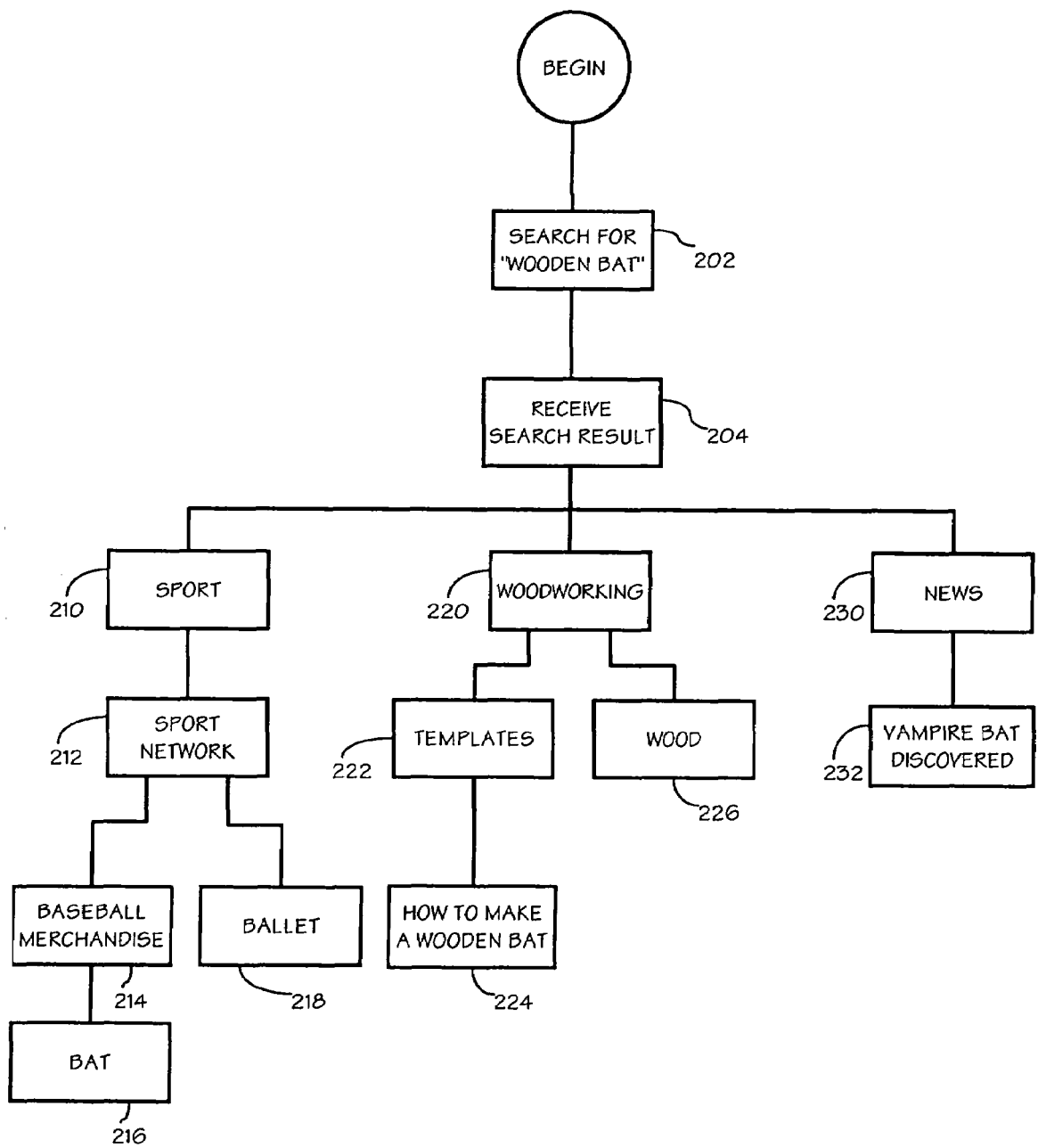
FIG. 2B is a block diagram depicting the interrelationship of the results of an exemplary search.

Referring now to FIG. 2A, an exemplary embodiment is shown wherein a window 24, separate from the display of the site 10 (FIG. 1), is utilized to preview linked sites 20 contained in the originally accessed site 10. In this embodiment, a user may preview a plurality of linked sites 20 contained in a site 10 (FIG. 1) by viewing representations 22 of the linked sites 20. Additionally, the relevancy of the linked sites 20 to a user's request may be readily determined. For example, as shown in FIG. 2B, a user may search for information regarding wooden bats. A user may then perform a search 202 using the terms "wooden bat" and receive a search result 204. Previously, a user needed to manually access each individual site to determine its relevancy. This may require accessing a plurality of hierarchies of sites and branches contained therein to find the desired information. For example, a user may wish to purchase a bat, which may require the user to access a sport site 210, then a sport network site 212, baseball merchandise site 214, and finally a bat site 216. By utilizing the present invention to preview sites, a user may determine that the sport 210 branch of the result is the most relevant, while ignoring erroneous results such as how to make a bat 224 in a woodworking site 220 and vampire bats 232 in a news story 230.

In the present example, a user searching for "wooden bats" may be interested in purchasing a wooden bat, making a wooden bat, etc. By utilizing the present invention, a user may initiate a preview function of the present invention, for instance, by using a keystroke or a combination of key strokes, voice command, cursor position, etc. to generate a linked site preview screen 24 as shown in FIG. 2A. The preview screen 24 may contain a listing of linked sites 20 as well as representations 22 of the sites 20. By viewing the representations 22 and links 20, a user may determine that certain sites contain information relevant to the current search, such as baseball merchandise as opposed to a wood listing in a woodworking site. A user may then judge the relevancy of a search result by not only viewing a textual listing of the link 20, but by viewing a representation 22 of the linked site 30 (FIG. 1) itself. As discussed earlier, a representation 22 may incorporate a thumbnail of the linked site 30 (FIG. 1) so that a user may view the contents of the actual linked site 30 (FIG. 1), instead of relying on the accuracy of the link description. In this way, a user may avoid misrepresentations by site providers and other erroneous listings by viewing the actual contents of the site through the use of a representation 22 without the need of manually accessing the linked site 30 (FIG. 1).

Additionally, the separate preview screen 24 may be utilized to determine the relevancy of linked sites 30 contained in a particular site 10 (FIG. 1). This allows a user to utilize a separate preview screen 24 for a site 10 (FIG. 1) that contains a plurality of links, contains a large amount of information, etc. A user may then determine not only the relevancy of the linked sites 20 by viewing the representations 22 of those sites, but may also view the totality of the linked sites 22 contained in the site 10 without locating each link 20 contained in the site 10 (FIG. 1). For example, as shown in FIG. 2, if a user accessed a comprehensive site containing links to a variety of information, the user may utilize the linked site preview screen 24 to determine the contents of the site, as well as preview the subject matter of linked sites 30 (FIG. 1) by utilizing representations 22 of the sites 30 (FIG. 1).

Figure 3:
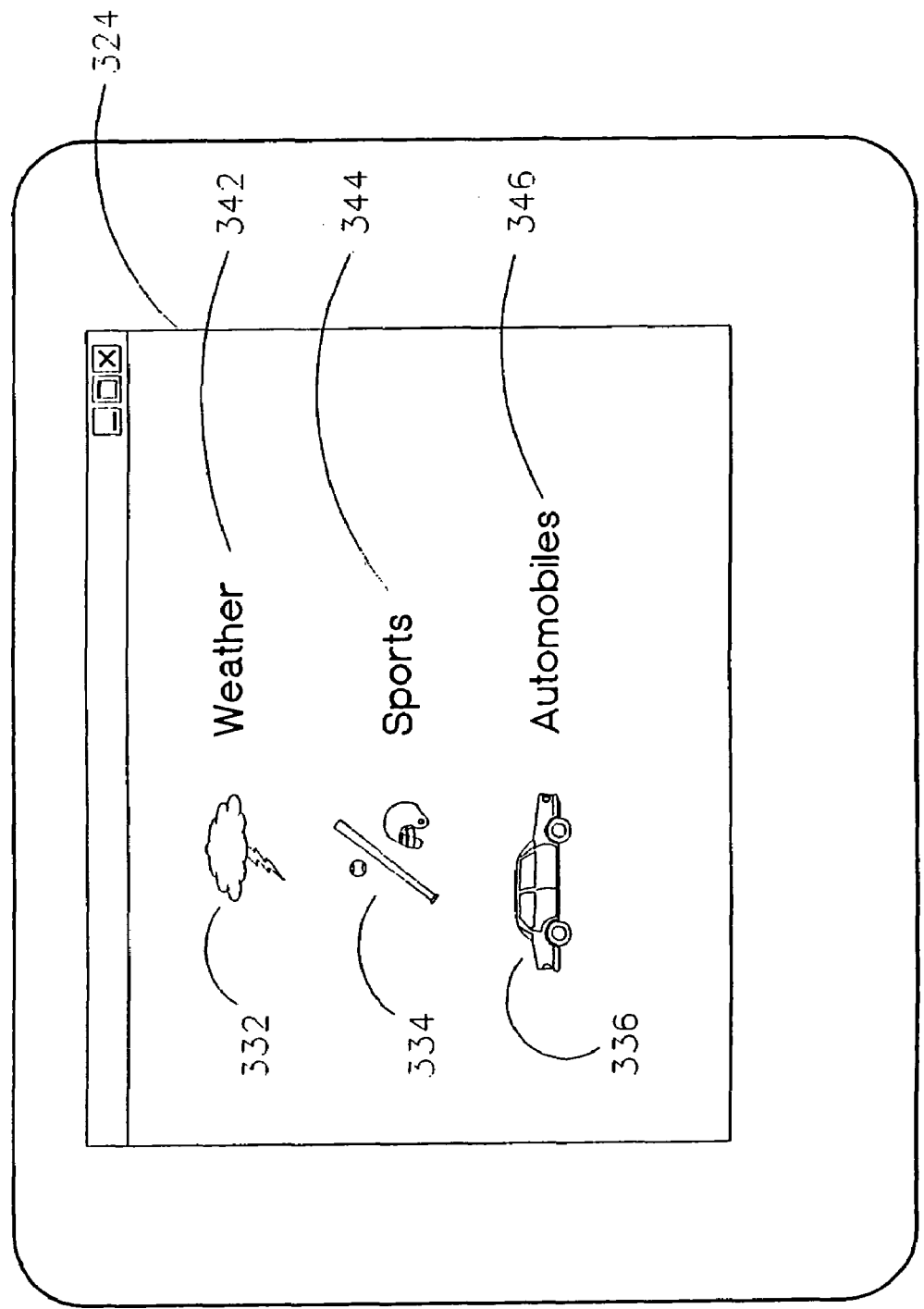
FIG. 3 is an illustration depicting exemplary representations of linked sites.

In another exemplary embodiment of the present invention, it may be preferable to utilize a representation of a linked site based on descriptive information contained in the site and/or on the link itself. Descriptive information may include search information utilized by browsers to access relevant sites in a search, such as tags, domain names, etc. As shown in FIG. 3, representations may be generated by identifying descriptive information contained in the link, linked site tag, etc. For example, if a weather link 342 was identified, a weather representation 332 may be displayed. Representations may be stored in a library that may be accessed to generate a representation correlated with the appropriate descriptive information. Examples of associating descriptive information, such as keywords, with representations include a sports representation 334 for sports keywords such as sport 344, baseball, football, etc., an automobile representation 336 for automobile related keywords, such as car, automobile 346, motorcar etc. It may also be preferable to utilize a separate screen 324 so a user may view the links contained in a site in a concise manner as well as topical relationships based on key words contained in the descriptive information, such as a link, linked site tag, domain name, etc. A user searching a particular area of interest may follow representations based on the area of interest, such as weather 342, sports 344, or automobiles 346. The user may then quickly scan the links and representations without manually accessing the actual linked site. Furthermore, a user may view representations based on the linked site tag or other hidden descriptive information to utilize information not normally seen, thereby allowing the viewer to base viewing options on a wider range of information. Moreover, it may be preferable to allow the user to customize representation/keyword correlation as well as the representations and keywords themselves to allow personalized previewing.

Figure 4A:
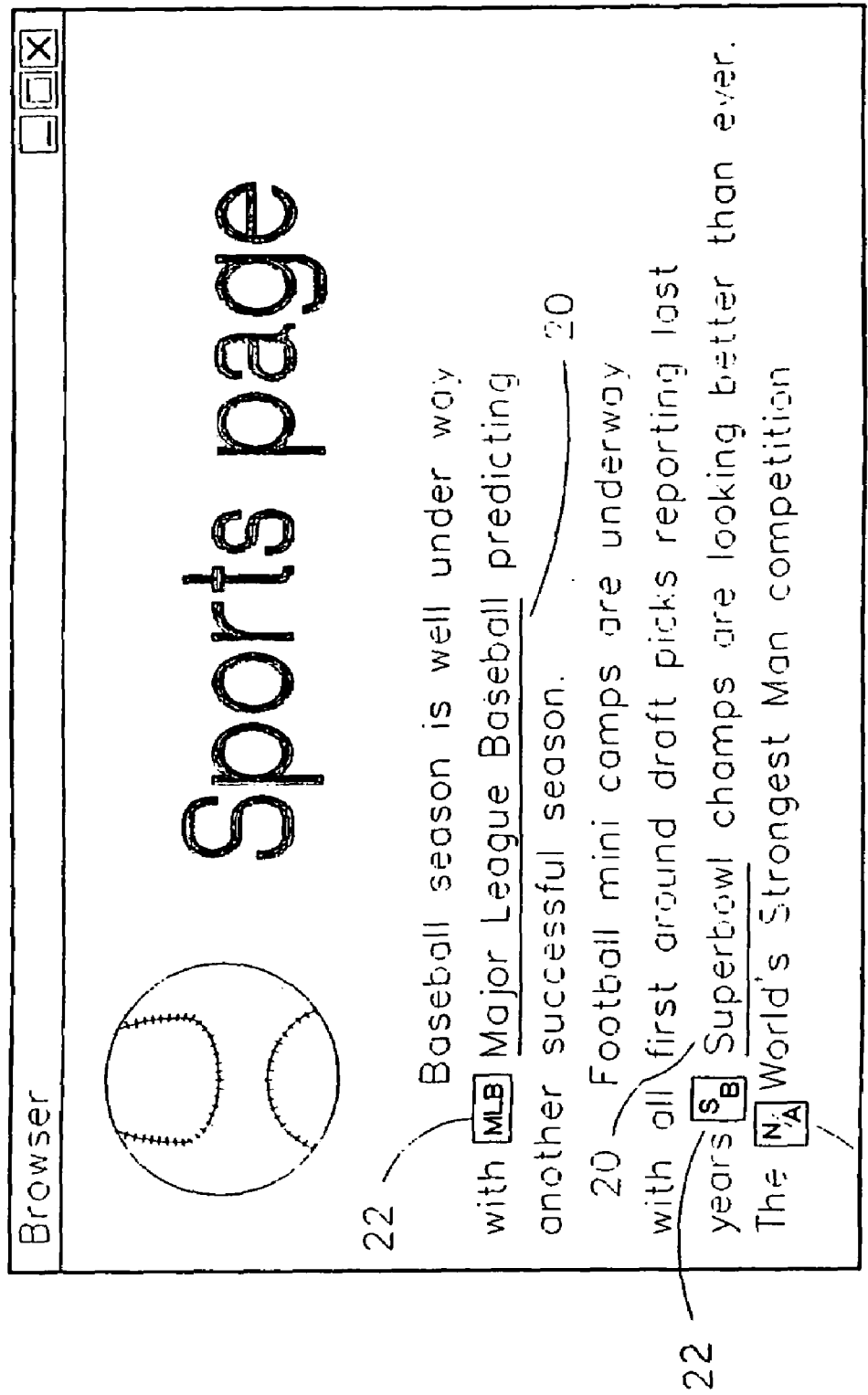
FIG. 4A is an illustration depicting an exemplary embodiment of the present invention wherein representations are disposed proximally to links contained in a display of a site.

Referring now to FIG. 4A, an exemplary embodiment is shown wherein the display of a site, in this instance a web page, includes representations displayed proximally to a plurality of links. In this example, a web page displaying sports related links is shown. Representations 22 are disposed proximally, in this instance directly before, the corresponding link 20. In some instances, a link may not be accessible, thereby preventing a representation, such as a thumbnail, of the contents of the linked site to be created for the inaccessible site. An inaccessible representation 26 (FIG. 7) may be generated indicating that the link is not accessible. A variety of representations may be utilized to indicate the cause of the inaccessibility, such as server not responding, etc. Additionally, it may be preferable to utilize a library of representations based on keywords so that topic, etc may preview the linked site.

Figure 4B:
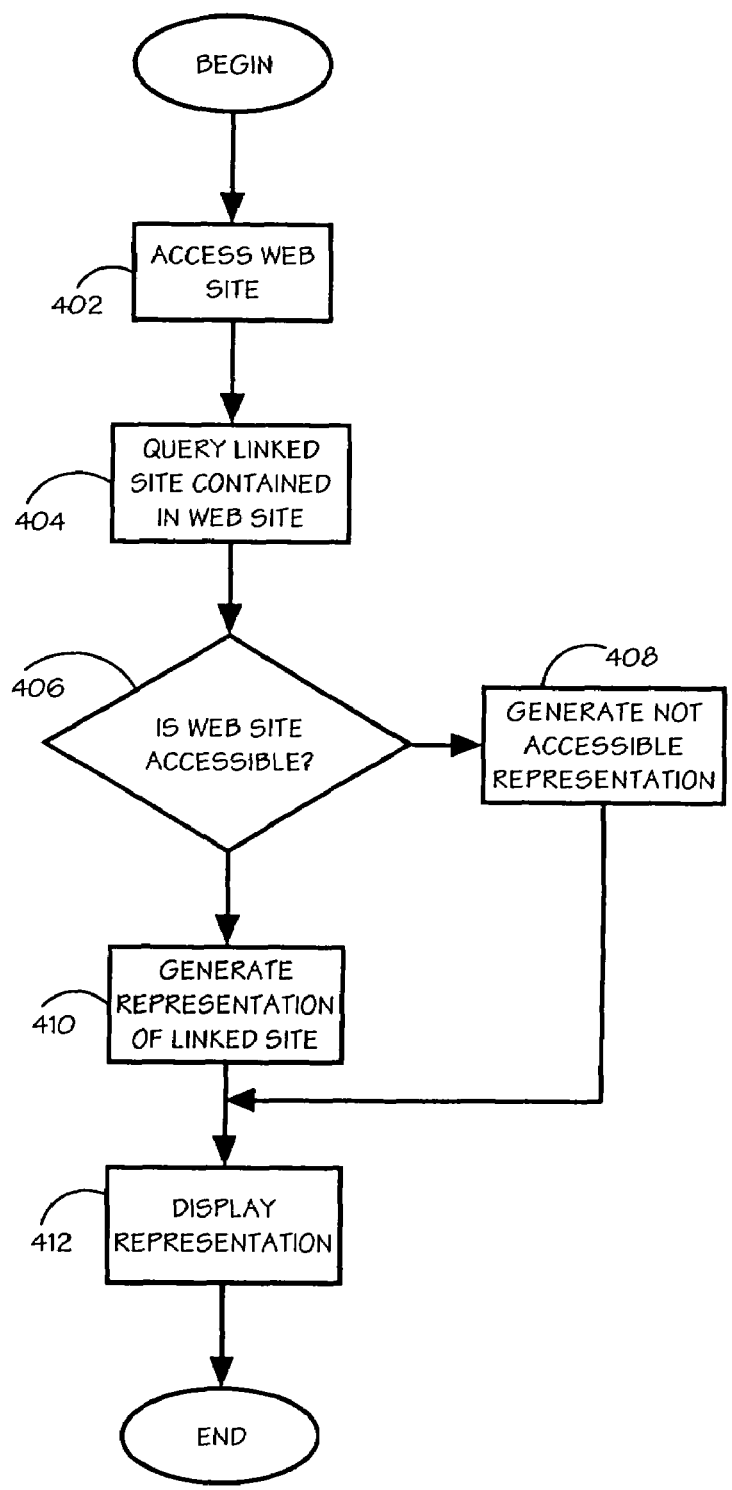
FIG. 4B is a flow chart depicting an exemplary method of previewing linked sites.

Referring now to FIG. 4B, an exemplary method for determining the accessibility of a site is shown. A user may access a site 402 containing links to other sites. A linked site may be queried 404 to generate a representation of the site. The system may then determine if a site is accessible 406. If the site is not accessible, the system may generate a not accessible representation 408. However, if the site is accessible, a representation of the linked site 410, such as a thumbnail, library representation matched through keywords, etc. may be generated. The representation may then be communicated 412 so a user may preview the linked site without manually accessing the linked site.

Figure 5:
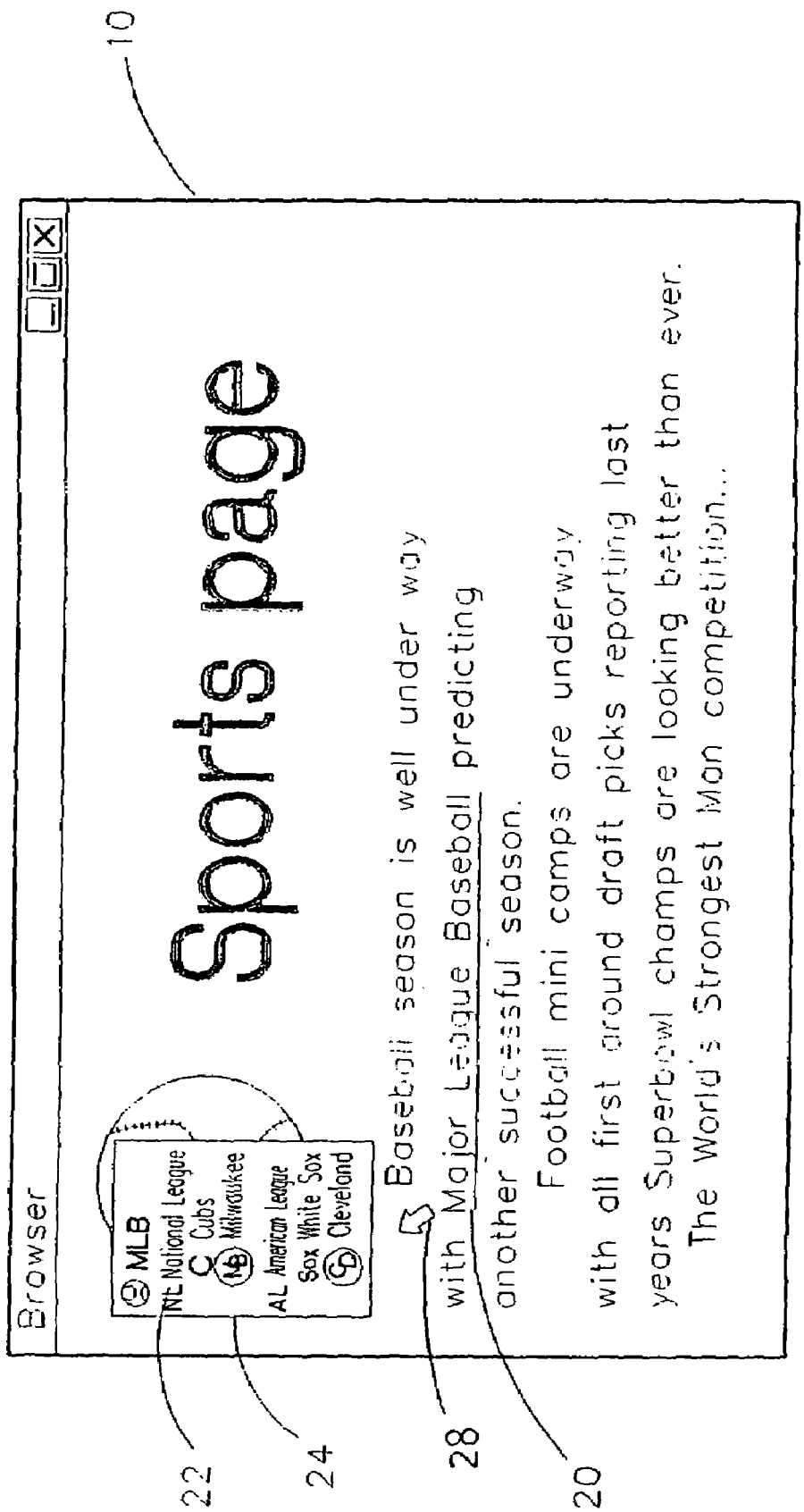
FIG. 5 is an illustration depicting an exemplary embodiment of the present invention wherein a separate window is utilized as a menu.

Accessing a separate screen containing representations of linked sites may be accomplished in a variety of ways. As shown in FIG. 5, a separate screen 24 may be utilized as a pop-up menu to display representations 22 contained in a site 10. A separate screen 24 may be initiated utilizing a variety of methods such as a key-press combination, right-clicking a mouse when the cursor 28 is over a link 20, merely moving a cursor 28 over a link 20 which may then automatically display a preview screen 24, etc. Additionally, a separate screen may be utilized to preview sites connected to a particular link 20, or all links contained in the site. For example, a separate screen may be utilized to display representations for a link disposed proximally to a cursor 28, so that when a user moves a cursor 28 near a link 20, a separate screen, such as a pop-up menu, is displayed showing representations of linked sites connected to that particular link.

In another exemplary embodiment of the present invention, it may be preferable to initiate and terminate the advanced network viewing aspects of the present invention by a key press or other user action. In some instances computing power and throughput rate are limited in a user's system. Therefore, a user may not wish to preview all the linked sites contained in an originally accessed site. Therefore, by utilizing a key-press combination, macro, or other switch or method a user may initiate the present system to preview sites contained within a site, while forgoing initiation of the process in other sites at the discretion of the user.

Figure 7:
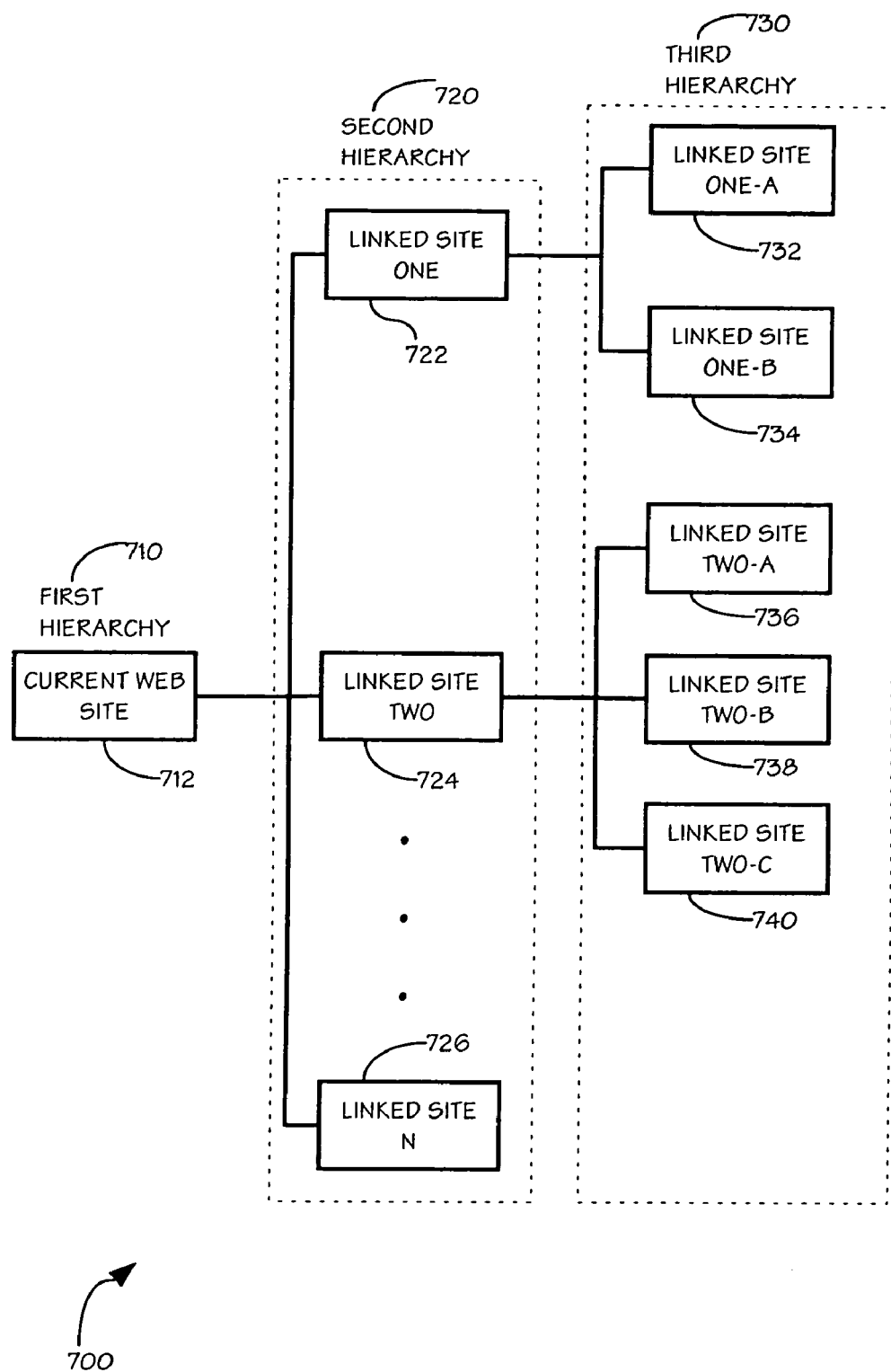
FIG. 7 is a block diagram depicting an exemplary organization of linked site hierarchies.

Furthermore, it may be preferable to search not only a site linked to the currently accessed site, but also site links contained in the linked sites. Referring now to FIG. 7, a plurality of hierarchies 700 of linked sites is shown. A first hierarchy 710 may contain a site 712 currently accessed by a user. A currently accessed site 712 may also contain links to a second hierarchy 720 of linked sites, such as linked site one 722, linked site two 724 through linked site n 726. Additionally, linked site one 722 may contain links to a third hierarchy 730 of linked sites, such as linked site one-a 732, and linked site one-b 734. Similarly, linked site two 724 may contain links to a third hierarchy 730 such as linked site two-a 736, linked site two-b 738, linked site two-c 740, etc. By enabling a user to preview links contained in linked sites, a user may determine not only the content of a first linked site, but also additional linked sites contained in the first linked site so as to enlarge the previewing scope. However, hierarchies 700 may continue indefinitely as sites contain links to other sites. Therefore, it may be preferable to limit the number of hierarchies 700 according to the needs and preferences of the user. For example, a user with a high access rate and fast processing capabilities may choose to preview a great number of sites. On the other hand, a user with limited resources, such as slow access speeds and slow processors, etc. may limit the present system to searching through a second hierarchy, third hierarchy, etc. Moreover, it may be preferable to limit the amount of linked sites previewed in a given site to further conserve resources. For example, it may be preferable to limit a preview to two linked sites, such as linked site one 722 and linked site two 724. Hierarchies 700 may be displayed as nested groups, as shown in FIGS. 2A and 5, tree charts, block diagrams, organization charts, etc. as contemplated by a person of ordinary skill in the art.

It may be preferable to store representations of linked sites on the server storing the originating site to conserve resources of an information handling system, such as throughput and processing power. Thus, when utilizing the previewing abilities of the present invention, a system may display representations, for instance from references to coded graphic images on the server storing the originating site, thereby obviating the need to access the linked sites each time the originating site is accessed. It may be preferable to generate and update representations during idle times of the server information handling system so as not to affect the performance of the system.

Figure 8:
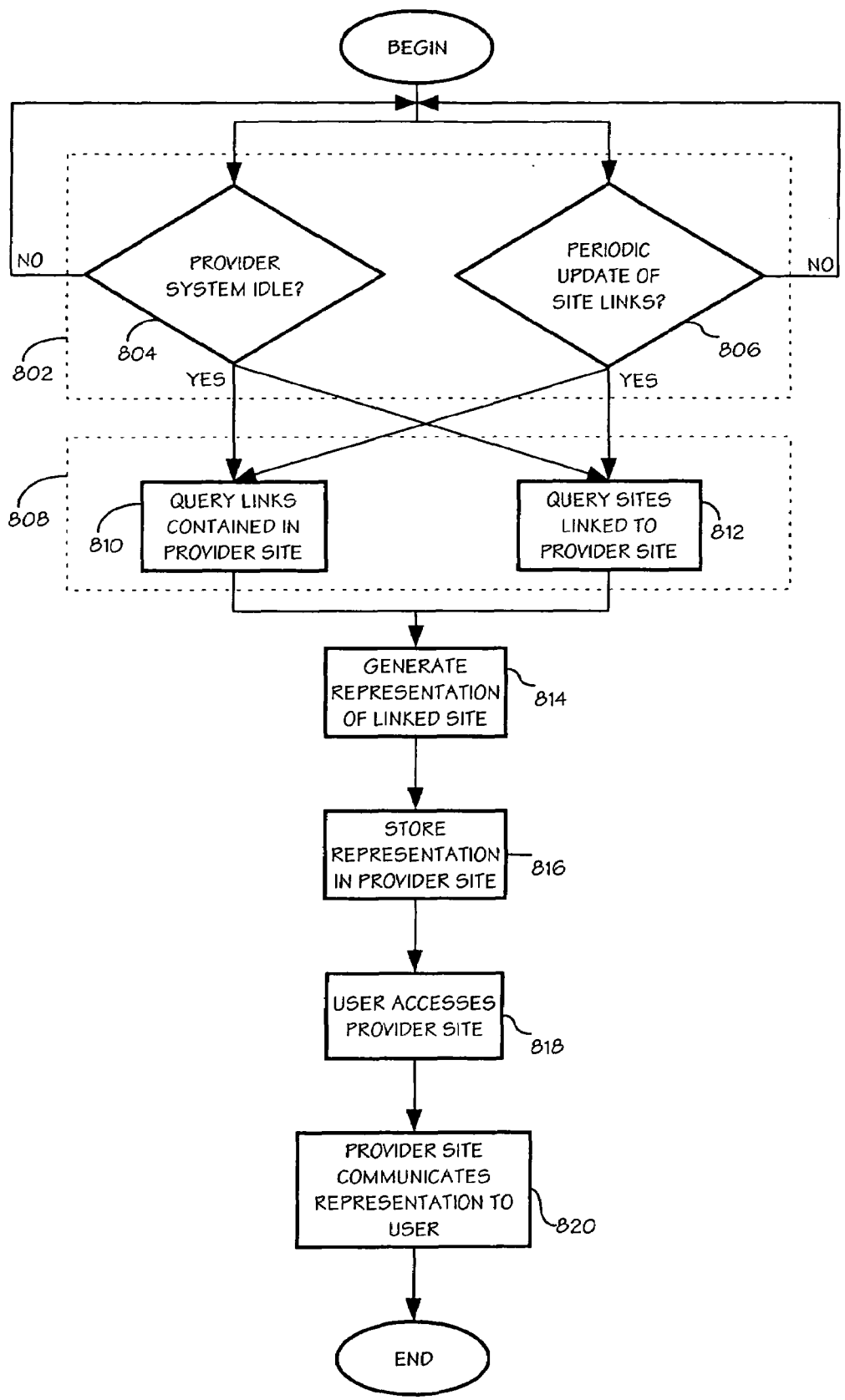
FIG. 8 is a flow chart depicting an exemplary method of generating representations of linked sites by a site provider during idle time and/or periodic updates.

An exemplary method of providing and storing representations in this manner is shown in FIG. 8. A site provider server may contain a utility that may be initiated by a predetermined event 802 to query 808 a linked site. A predetermined event 802 may include when the provider server system is idle 804 so as not to affect performance of the server system or during a scheduled periodic update of site links 806, etc. The server system may query 808 links contained in the provider site 810. The server system may then generate a representation of the linked site 814 based on the query so as to correlate keywords contained in the link with a graphical representation or query sites linked to the provider site 812 so as to create a thumbnail representation, etc. Next the system may store the representation in the provider site 816, for instance as a coded graphic image, so when a user accesses the provider site 818 the provider site may communicate the representation to the user 820 without accessing the linked site 30 (FIG. 1). In this way, a user may automatically preview linked sites from a provider site without needing to access the linked sites every time the provider site is accessed, thereby conserving processor and other information handling resources.

Figure 6:
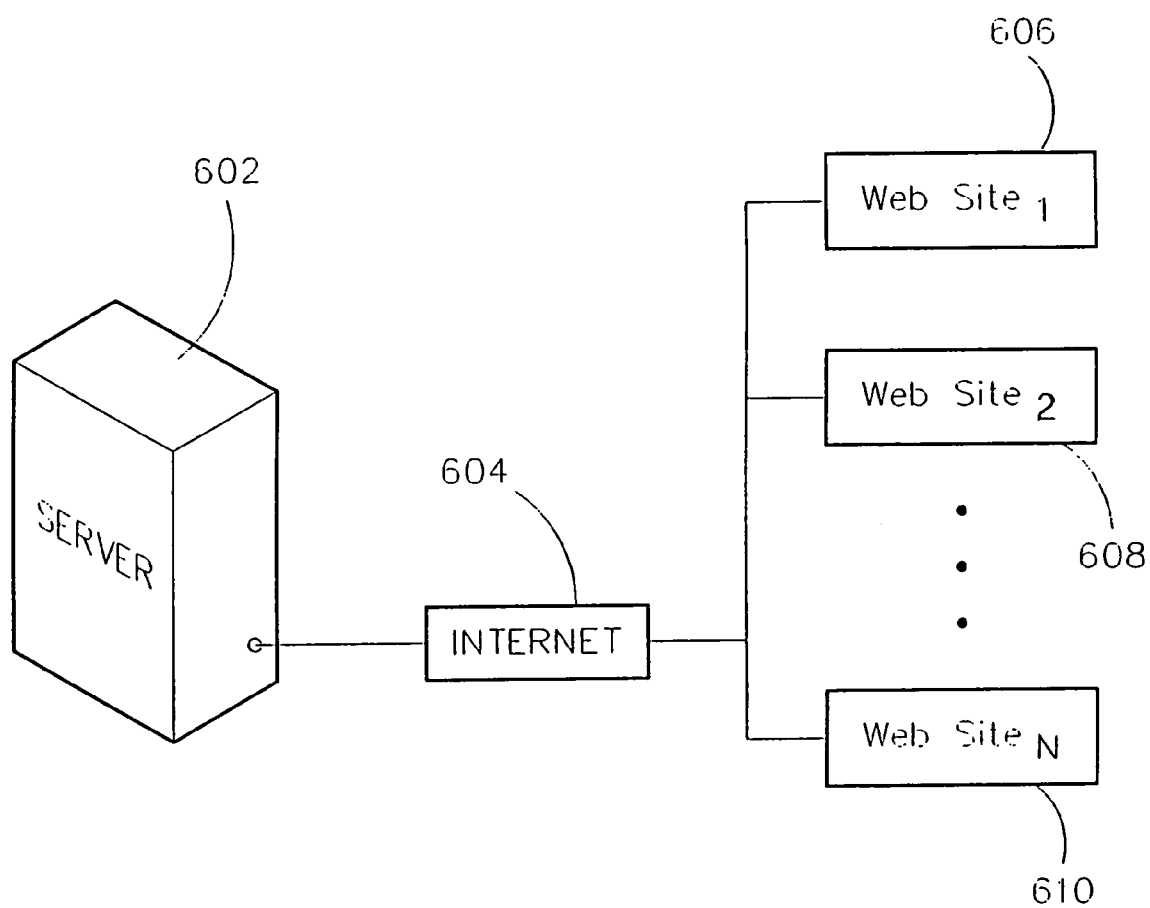
FIG. 6 is an illustration depicting an exemplary embodiment of the present invention wherein a linked site provides representations to sites that are linked to it.

As shown in FIG. 6, a utility may reside on a site provider server 602 to access each site link to provide a representation for storage on the site provider server 602 site. In this instance, a second site linked to a first site may provide representations of the second site to the first site. Representations may be stored on the first site, for example as coded graphic images. Accordingly, when a user accesses a first site, representations of the second site may be communicated that were previously stored on the first site so a user may preview the contents of the first site without manually accessing the second site. For example, if a provider of a popular site had many originating sites linked to the provider site, the provider may utilize a utility wherein the originating sites may obtain representations of the provider site for storing on the originating sites. As shown in FIG. 1, this may eliminate the need for the originating site 10 to access the linked site 30 to form a representation 22 of the site 30 each time the originating site 10 is accessed.

Figure 9:
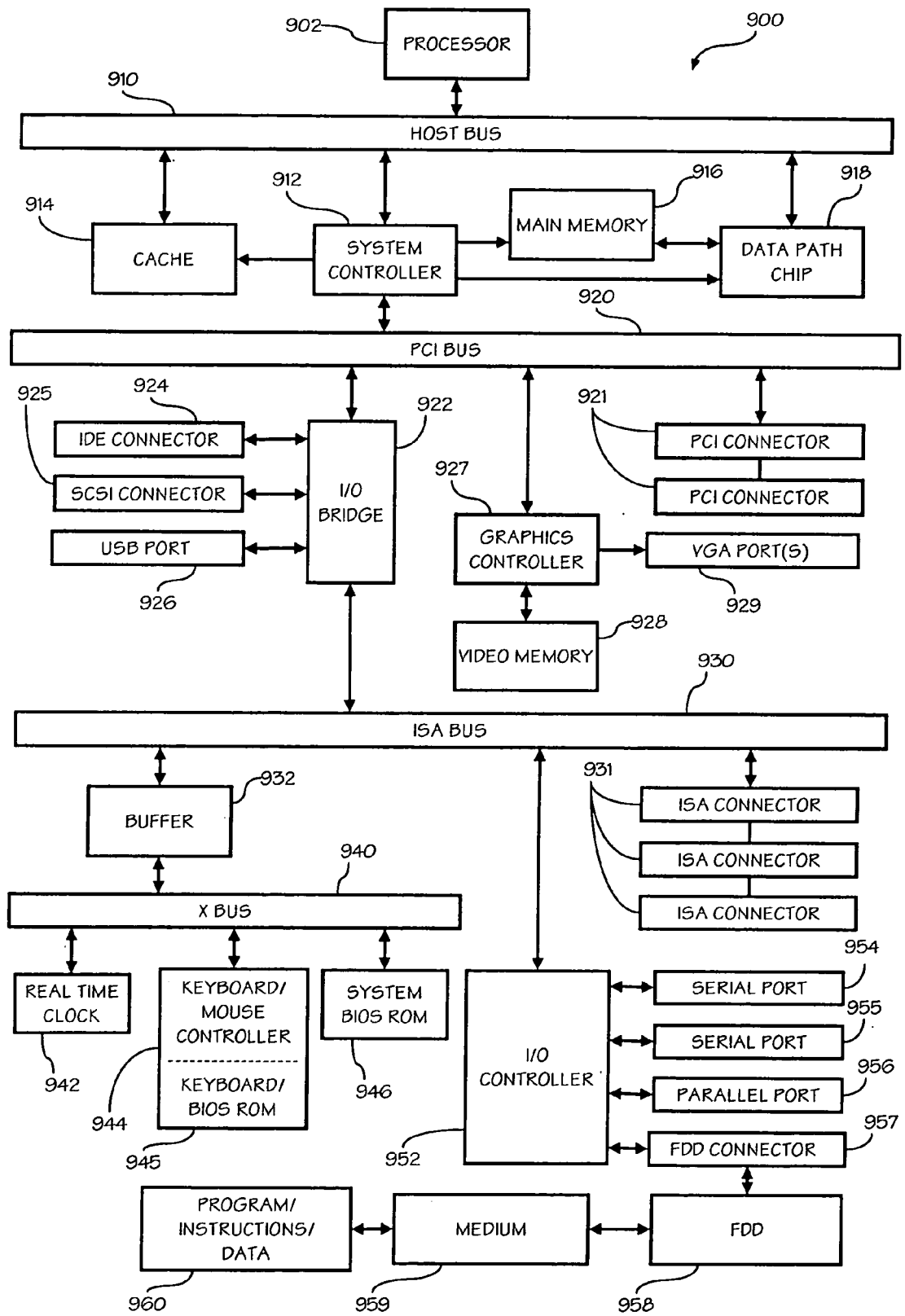
FIG. 9 is a block diagram depicting an exemplary information handling system according to the present invention.

Referring now to FIG. 9, a block diagram of an exemplary information handling system 900 according to the present invention is shown. In this embodiment, processor 902, system controller 912, cache 914, and data-path chip 918 are each coupled to host bus 910. Processor 902 is a microprocessor such as a 486-type chip, a Pentium®, Pentium II®, Pentium III® or other suitable microprocessor. Cache 914 provides high-speed local-memory data (in one embodiment, for example, 512 KB of data) for processor 902, and is controlled by system controller 912, which loads cache 914 with data that is expected to be used soon after the data is placed in cache 912 (i.e., in the near future). Main memory 916 is coupled between system controller 914 and data-path chip 918, and in one embodiment, provides random-access memory of between 16 MB and 128 MB of data. In one embodiment, main memory 916 is provided on SIMMS (Single In-line Memory Modules), while in another embodiment, main memory 916 is provided on DIMMs (Dual In-line Memory Modules), each of which plugs into suitable sockets provided on a motherboard holding many of the other components shown in FIG. 9. Main memory 916 includes standard DRAM (Dynamic Random-Access Memory), EDO (Extended Data Out) DRAM, SDRAM (Synchronous DRAM), or other suitable memory technology. System controller 912 controls PCI (Peripheral Component Interconnect) bus 920, a local bus for system 900 that provides a high-speed data path between processor 902 and various peripheral devices, such as video, disk, network, etc. Data-path chip 918 is also controlled by system controller 912 to assist in routing data between main memory 916, host bus 910, and PCI bus 920.

In one embodiment, PCI bus 920 provides a 32-bit-wide data path that runs at 33 MHZ. In another embodiment, PCI bus 920 provides a 64-bit-wide data path that runs at 33 MHZ. In yet other embodiments, PCI bus 920 provides 32-bit-wide or 64-bit-wide data paths that runs at higher speeds. In one embodiment, PCI bus 920 provides connectivity to I/O bridge 922, graphics controller 927, and one or more PCI connectors 921, each of which accepts a standard PCI card. In one embodiment, I/O bridge 922 and graphics controller 927 are each integrated on the motherboard along with system controller 912, in order to avoid a board-connector-board signal-crossing interface and thus provide better speed and reliability. In the embodiment shown, graphics controller 927 is coupled to a video memory 928 (that includes memory such as DRAM, EDO DRAM, SDRAM, or VRAM (Video Random-Access Memory)), and drives VGA (Video Graphics Adaptor) port 929. VGA port 929 can connect to VGA-type or SVGA (Super VGA)-type displays. Other input/output (I/O) cards having a PCI interface can be plugged into PCI connectors 921.

In one embodiment, I/O bridge 922 is a chip that provides connection and control to one or more independent IDE connectors 924–925, to a USB (Universal Serial Bus) port 926, and to ISA (Industry Standard Architecture) bus 930. In this embodiment, IDE connector 924 provides connectivity for up to two standard IDE-type devices such as hard disk drives, CDROM (Compact Disk-Read-Only Memory) drives, DVD (Digital Video Disk) drives, or TBU (Tape-Backup Unit) devices. In one similar embodiment, two IDE connectors 924 are provided, and each provide the EIDE (Enhanced IDE) architecture. In the embodiment shown, SCSI (Small Computer System Interface) connector 925 provides connectivity for up to seven or fifteen SCSI-type devices (depending on the version of SCSI supported by the embodiment). In one embodiment, I/O bridge 922 provides ISA bus 930 having one or more ISA connectors 931 (in one embodiment, three connectors are provided). In one embodiment, ISA bus 1030 is coupled to I/O controller 952, which in turn provides connections to two serial ports 954 and 955, parallel port 956, and FDD (Floppy-Disk Drive) connector 957. In one embodiment, FDD connector 957 is connected to FDD 958 that receives removable media (floppy diskette) 959 on which is stored data and/or program code 960. In one such embodiment, program code 960 includes code that controls programmable system 900 to perform the method described below. In another such embodiment, serial port 954 is connectable to a computer network such as the Internet, and such network has program code 960 that controls programmable system 900 to perform the method described below. In one embodiment, ISA bus 930 is connected to buffer 932, which is connected to X bus 940, which provides connections to real-time clock 942, keyboard/mouse controller 944 and keyboard BIOS ROM (Basic Input/Output System Read-Only Memory) 1045, and to system BIOS ROM 946.

FIG. 9 shows one exemplary embodiment of the present invention, however other bus structures and memory arrangements are specifically contemplated.

In one embodiment, I/O bridge 922 is a chip that provides connection and control to one or more independent IDE connectors 924–925, to a USB (Universal Serial Bus) port 926, and to ISA (Industry Standard Architecture) bus 930. In this embodiment, IDE connector 924 provides connectivity for up to two standard IDE-type devices such as hard disk drives or CDROM (Compact Disk-Read-Only Memory) drives, and similarly IDE connector 925 provides connectivity for up to two IDE-type devices. In one such embodiment, IDE connectors 924 and 925 each provide the EIDE (Enhanced IDE) architecture. In one embodiment, I/O bridge 922 provides ISA bus 930 having one or more ISA connectors 931 (in one embodiment, three connectors are provided). In one embodiment, ISA bus 930 is coupled to I/O controller 952, which in turn provides connections to two serial ports 954 and 955, parallel port 956, and FDD (Floppy-Disk Drive) connector 957. In one embodiment, ISA bus 930 is connected to buffer 932, which is connected to X bus 940, which provides connections to real-time clock 942, keyboard/mouse controller 944 and keyboard BIOS ROM (Basic Input/Output System Read-Only Memory) 945, and to system BIOS ROM 946.

Although the invention has been described with a certain degree of particularity, it should be recognized that elements thereof may be altered by persons skilled in the art without departing from the spirit and scope of the invention. As will be appreciated by those skilled in the art, one of the embodiments of the invention can be implemented as sets of instructions resident in the main memory 916 of one or more information handling systems configured generally as described in FIG. 9. Until required by the information handling system, the set of instructions may be stored in another readable memory device, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another information handling system and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the system and method of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method for advanced network viewing, comprising:
   accessing a first site;
   querying at least one of a link and a second site linked to said first site;
   generating a user-customizable representation of said linked second site, the representation being a graphical image indicative of content of said linked second site;
   correlating, as directed by a user, a user-customizable keyword with the representation;
   communicating the keyword and representation wherein the communicated keyword and representation enables a user to preview the linked second site;
   storing the keyword and representation of said linked second site; and
   periodically updating the stored keyword and representation of said linked second site by at least one of the linked second site and the first site.

2. The method as described in claim 1, wherein the querying step includes limiting the scope of the query by including a defined limitation.

3. The method as described in claim 2, wherein the limiting step includes at least one of a hierarchy and number of links.

4. The method as described in claim 1, wherein the generating step includes forming a thumbnail representation of the linked second site.

5. The method as described in claim 4, wherein the thumbnail representation is formed by taking a snapshot of the linked second site.

6. The method as described in claim 1, wherein the updating step is performed during idle time.

7. The method as described in claim 1, wherein the communicating step includes displaying the representation in a separate window.

8. The method as described in claim 1, wherein the communicating step includes displaying the representation as part of display of the first site so that the representation may be viewed as a component part of the first site.

9. The method as described in claim 8, wherein the representation is displayed proximally to the link.

10. The method as described in claim 1, wherein if the linked second site is not accessible, generating a representation indicating that the linked second site is not accessible.

11. The method as described in claim 1, wherein the representation is a pop-up menu.

12. The method as described in claim 1, further comprising generating an additional representation of a site linked within the linked second site, the generated additional representation generated to indicate the linkage to the linked second site.

13. The method as described in claim 1, wherein the linked second site is a web page included within the first site.

14. The method as described in claim 1, further comprising displaying, as part of the first site, the link to the linked second site.

15. The method as described in claim 1, wherein the representation is separate from a hyperlink to the linked second site.

16. A program of instructions storable on a medium readable by an information handling system for causing the information handling system to execute steps for advanced network viewing, the steps comprising:
   accessing a first site;
   querying at least one of a link and a second site linked to said first site;
   generating a user-customizable representation of said linked second site, the representation being a graphical image indicative of content of said linked second site;
   correlating, as directed by a user, a user-customizable keyword with the representation;
   communicating the keyword and representation wherein the communicated keyword and representation enables a user to preview the linked second site;
   storing the keyword and representation of said linked second site; and
   periodically updating the stored keyword and representation of said linked second site by at least one of the linked second site and the first site.

17. The program of instructions as described in claim 16, wherein the querying step includes limiting the scope of the query by including a defined limitation.

18. The program of instructions as described in claim 17, wherein the limiting step includes at least one of a hierarchy and number of links.

19. The program of instructions as described in claim 16, wherein the generating step includes forming a thumbnail representation of the linked second site.

20. The program of instructions as described in claim 19, wherein the thumbnail representation is formed by taking a snapshot of the linked second site.

21. The program of instructions as described in claim 16, wherein the updating step is performed during idle time.

22. The program of instructions as described in claim 16, wherein the communicating step includes displaying the representation in a separate window.

23. The program of instructions as described in claim 16, wherein the communicating step includes displaying the representation as part of the first site so that the representation is viewed as a component part of the first site.

24. The program of instructions as described in claim 23, wherein the representation is displayed proximally to the link.

25. The program of instructions as described in claim 16, wherein if the linked second site is not accessible, generating a representation indicating that the linked second site is not accessible.

26. The program of instructions as described in claim 16, wherein the representation is a pop-up menu.

27. The program of instructions as described in claim 16, further comprising generating an additional representation of a site linked within the linked second site, the generated additional representation generated to indicate the linkage to the linked second site.

28. The program of instructions as described in claim 16, wherein the linked second site is a web page included within the first site.

29. The program of instructions as described in claim 16, wherein the steps further comprising displaying, as part of the first site, the link to the linked second site.

30. An information handling system for advanced network viewing, comprising:
   a processor for executing a program of instructions on the information handling system;
   a memory coupled to the processor for storing the program of instructions executable by said processor; and
   an input and output system coupled to the processor for coupling the information handling system to a network wherein the program of instructions configures the information handling system to
   access a first site;
   query at least one of a link and a second site linked to said first site;
   generate a user-customizable representation of said linked second site, the representation being a graphical image indicative of content of said linked second site;
   correlate, as directed by a user, a user-customizable keyword with the representation;
   communicate the keyword and representation wherein the communicated keyword and representation enables a user to preview the linked second site;
   store the keyword and representation of said linked second site; and
   periodically update the stored keyword and representation of said linked second site by at least one of the linked second site and the first site.

31. The information handling system as described in claim 30, wherein the network includes at least one of the Internet, world wide web, bulletin board service, file transfer protocol site, local area network, and wide area network.

32. The information handling system as described in claim 30, wherein query instruction includes a limiting instruction thereby limiting the scope of the query by including a defined limitation.

33. The information handling system as described in claim 32, wherein the limiting instruction includes at least one of a hierarchy and number of links.

34. The information handling system as described in claim 30, wherein the generate instruction includes forming a thumbnail representation of the linked second site.

35. The information handling system as described in claim 34, wherein the thumbnail representation is formed by taking a snapshot of the linked second site.

36. The information handling system as described in claim 30, wherein the periodically updated stored representation is updated during idle time.

37. The information handling system as described in claim 30, wherein the communicate instruction includes displaying the representation in a separate window.

38. The information handling system as described in claim 30, wherein the communicate instruction includes displaying the representation as part of the first site so that the representation is viewed as a component part of the first site.

39. The information handling system as described in claim 38, wherein the representation is displayed proximally to the link.

40. The information handling system as described in claim 30, wherein if the linked second site is not accessible, generating a representation indicating that the linked second site is not accessible.

41. The information handling system as described in claim 30, wherein the representation is a pop-up menu.

42. The information handling system as described in claim 30, further comprising generating an additional representation of a site linked within the linked second site, the generated additional representation generated to indicate the linkage to the linked second site.

43. The information handling system as described in claim 30, wherein the linked second site is a web page included within the first site.

44. The information handling system as described in claim 30, wherein the program of instructions further configures the information handling system to display, as part of the first site, the link to the linked second site.

45. An information handling system for advanced network viewing, comprising:
   a processor for executing a program of instructions on the information handling system;
   a memory coupled to the processor for storing the program of instructions executable by said processor; and
   an input and output system coupled to the processor for coupling the information handling system to a network wherein the program of instructions configures the information handling system to include
   means for accessing a first site;
   means for querying at least one of a link and a second site linked to said first site;
   means for generating a user-customizable representation of said linked second site, the representation being a graphical image indicative of content of said linked second site;
   means for correlating, as directed by a user, a user-customizable keyword with the representation;
   means for communicating the keyword and representation;
   wherein the communicated keyword and representation enables a user to preview the linked second site;
   means for storing the keyword and representation of said linked second site; and
   means for periodically updating the stored keyword and representation of said linked second site by at least one of the linked second site and the first site.

46. The information handling system as described in claim 45, wherein the network includes at least one of the Internet, world wide web, bulletin board service, file transfer protocol site, local area network, and wide area network.

47. The information handling system as described in claim 45, wherein querying means includes a defined limitation thereby limiting the scope of the query.

48. The information handling system as described in claim 47, wherein the limitation includes at least one of a hierarchy and number of links.

49. The information handling system as described in claim 45, wherein the generating means includes forming a thumbnail representation.

50. The information handling system as described in claim 49, wherein the thumbnail representation is formed by taking a snapshot.

51. The information handling system as described in claim 45, wherein the periodically updated stored representation is updated during idle time.

52. The information handling system as described in claim 45, wherein the communicating means includes displaying the representation in a separate window.

53. The information handling system as described in claim 45, wherein the communicating means includes displaying the representation as part of the first site.

54. The information handling system as described in claim 53, wherein the representation is displayed proximally to the link.

55. The information handling system as described in claim 45, wherein when the linked second site is not accessible the generating means utilizes a representation indicating that the linked second site is not accessible.

56. The information handling system as described in claim 45, wherein the representation is a pop-up menu.

57. The information handling system as described in claim 45, further comprising generating an additional representation of a site linked within the linked second site, the generated additional representation generated to indicate the linkage to the linked second site.

58. The information handling system as described in claim 45, wherein the linked second site is a web page included within the first site.

59. The information handling system as described in claim 45, wherein the program of instructions configures the information handling system to further include means for displaying, as part of the first site, the link to the linked second site.

60. A system for advanced network viewing, comprising:
a first site; and
a second site linked over a network to said first site; wherein the second site provides a user-customizable representation of said second site and a user-customizable keyword correlated, as directed by a user, with the representation to said first site, the representation being a graphical image indicative of content of said linked second site so that a user may access said first site and preview said second site and wherein the second site stores said representation and correlated keyword of said linked second site and periodically updates the representation and correlated keyword of said linked second site by at least one of the linked second site and the first site.

61. The system as described in claim 60, wherein the network includes at least one of the Internet, a local area network, and a wide area network.

62. The system as described in claim 60, wherein the periodically updated stored representation is updated during idle time.

63. The system as described in claim 60, wherein the representation is a pop-up menu.

64. The system as described in claim 60, further comprising generating an additional representation of a site linked within the linked second site, the generated additional representation generated to indicate the linkage to the linked second site.

65. The system as described in claim 60, wherein the linked second site is a web page included within the first site.

66. The system as described in claim 60, wherein a link to the linked second site is displayed as part of the first site.

* * * * *